(12) United States Patent
Wirth (10) Patent No.: US 8,374,011 B2
(45) Date of Patent: Feb. 12, 2013

(54) METHOD AND APPARATUS FOR BOOSTING DC BUS VOLTAGE

(75) Inventor: William F. Wirth, Johnson Creek, WI (US)

(73) Assignee: Magnetek, Inc., Menomonee Falls, WI (US)

( * ) Notice: Subject to any disclaimer, the term of this patent is extended or adjusted under 35 U.S.C. 154(b) by 375 days.

(21) Appl. No.: 12/859,949

(22) Filed: Aug. 20, 2010

(65) Prior Publication Data

US 2012/0044731 A1 Feb. 23, 2012

(51) Int. Cl.
 *H02M 7/537* (2006.01)
(52) U.S. Cl. .............. 363/131; 363/17; 363/34; 363/69; 363/71; 363/72; 363/95; 363/98; 363/125; 363/132
(58) Field of Classification Search ............ 363/17, 363/34, 69, 71, 72, 95, 98, 125, 131, 132; 323/222–224, 259, 269, 270–272
See application file for complete search history.

(56) References Cited

U.S. PATENT DOCUMENTS

| | | | |
|---|---|---|---|
| 5,262,935 A * | 11/1993 | Shirahama et al. | ............. 363/71 |
| 5,355,295 A | 10/1994 | Brennen | |
| 5,460,244 A | 10/1995 | Tanahashi | |
| 7,099,169 B2 | 8/2006 | West et al. | |
| 7,463,500 B2 | 12/2008 | West | |
| 7,479,774 B2 | 1/2009 | Wai et al. | |
| 7,564,703 B1 | 7/2009 | Braun et al. | |
| 7,596,008 B2 * | 9/2009 | Iwata et al. | ............. 363/71 |
| 7,773,396 B2 * | 8/2010 | Ollila et al. | ............. 363/72 |
| 8,217,533 B2 * | 7/2012 | Jones et al. | ............. 307/82 |
| 2006/0083039 A1 | 4/2006 | Oliveira et al. | |
| 2009/0121549 A1 | 5/2009 | Leonard | |
| 2010/0020576 A1 * | 1/2010 | Falk | ............. 363/55 |
| 2010/0133904 A1 | 6/2010 | Klodowski et al. | |

OTHER PUBLICATIONS

International Search Report and Written Opinion—(Intl. Application No. PCT/US2011/048643)—9 Pages.

* cited by examiner

*Primary Examiner* — Bao Q Vu
*Assistant Examiner* — Yemane Mehari
(74) *Attorney, Agent, or Firm* — Boyle Fredrickson, S.C.

(57) ABSTRACT

A power converter includes at least two power conversion sections operating in parallel. The power converter receives a variable input power and generates an AC output voltage. When the power source is generating enough power to supply a DC voltage to the power converter greater than or equal to the peak magnitude of the desired AC voltage output, each power conversion section operates in parallel, converting the DC voltage to the desired AC voltage output. When the power generated by the variable power source results in a DC voltage having a magnitude less than the peak magnitude of the desired AC voltage output, the power conversion sections operate in series. One power conversion section operates as a boost converter to boost the DC voltage level to a suitable level for the second power conversion section, which generates the desired AC output voltage.

20 Claims, 5 Drawing Sheets

METHOD AND APPARATUS FOR BOOSTING DC BUS VOLTAGE

BACKGROUND OF THE INVENTION

The subject matter disclosed herein relates to a method and system for boosting the magnitude of the voltage on the direct current (DC) link of an inverter. More specifically, one inverter section operating in parallel with another inverter section may be selectively configured to either boost the magnitude of the voltage on the DC bus or convert the DC power to alternating current (AC) power.

There is an ever increasing demand for energy supplied by renewable energy sources. The power supplied by many renewable energy sources varies in magnitude and/or frequency. For example, photovoltaic (PV) arrays typically generate DC power which is dependent on the amount of light reaching the array and wind turbines typically generate AC power that varies in frequency according to the velocity of the turbine blades driving the generators. However, electronic devices are designed to be operated by power supplied at a fixed magnitude and frequency, such as the utility grid. Consequently, power converters are utilized with these power sources to convert the variable power supplied by the renewable energy source into power supplied at a fixed magnitude and frequency.

Power converters are available in many configurations. For example, power converters may convert DC to AC, AC to DC, DC at a first voltage level to DC at a second voltage level, or AC at a first frequency to AC at a second frequency. PV arrays typically generate DC power and utilize a power converter to convert the power generated by the array into AC power compatible with a utility grid. Wind turbines typically drive AC generators and utilize a two-stage converter that first converts the variable frequency AC power into DC power and subsequently converts this DC power into AC power compatible with the utility grid. Pulse width modulation (PWM) is one well known technique for converting DC power into AC power compatible with the utility grid.

Pulse width modulation is a high speed switching technique used to convert a DC voltage to an AC output voltage having a desired magnitude and frequency. Over a predefined switching period, the DC voltage is connected to the output for a percentage of the switching period, such that the output voltage alternates between zero volts and the DC voltage. The resulting average DC voltage observed at the output is equal to the magnitude of the switched DC voltage multiplied by the percentage of the switching period during which the reference voltage is connected to the output. The PWM routine may vary this percentage during each switching period such that the average DC voltage at the output changes at a desired AC output frequency. If the switching frequency is much greater than the desired AC output frequency, the voltage observed at the output approximates an AC output voltage.

Because the AC output voltage is generated by PWM switching of the DC reference voltage, the maximum value that the peak AC output voltage may be is equal to the magnitude of the switched DC voltage. Consequently, the DC voltage present in the power converter must be equal to or greater than the peak value of the desired AC output voltage in order for the converter to generate the desired output voltage.

However, due to the variable nature of many renewable energy sources, the DC voltage generated by the energy source is not always greater than the peak value of the desired AC output voltage. For example, the amount of power generated by PV arrays typically follows a bell-shaped curve. During early morning or late evening hours, the amount of power generated by the PV array drops below a minimum power threshold at which the necessary DC voltage to the converter may be maintained. Similarly, wind turbines have a cut-in speed, which is the minimum wind speed at which the wind turbine may operate. If the wind speed drops below this cut-in speed, the amount of power generated by the turbine is again not sufficient to maintain the necessary DC voltage for the converter.

Historically, attempts to overcome this limitation include lowering the magnitude of the desired output voltage. For example, a transformer may be included at the output of the converter. Utilizing the transformer to step-up the output voltage from a lower magnitude to match the magnitude of the grid voltage permits a lower desired output voltage from the power converter and, therefore, the power converter may continue operating at lower DC voltage levels.

However, including a transformer on the output of the converter is not without drawbacks. First, the transformer itself may require a substantial increase in the cost of the system. Second, the renewable energy source generates a specific amount of power, which is the product of the output voltage multiplied by the output current. If the power level remains the same and the output voltage is reduced, the output current necessarily increases. Consequently, the power converter components must be sized to handle the increased current, which similarly increases the cost of the system.

Other attempts to overcome the limitation of a low DC voltage include adding a DC boost converter to the input of the power converter. The DC boost converter increases the DC voltage on the DC link if the voltage level is not of sufficient magnitude to convert the DC voltage to an AC voltage of the desired magnitude. However, adding the DC boost converter requires additional switching devices and their related control components, again increasing the cost of the system.

Thus, it would be desirable to provide a power converter capable of operating over an increased range of DC voltages without a significant increase in cost.

BRIEF DESCRIPTION OF THE INVENTION

The subject matter disclosed herein describes a method and system for boosting the magnitude of the voltage on the DC bus of a power converter. The power converter includes at least two power conversion sections operating in parallel. By having multiple power conversion sections operating in parallel, each power conversion section converts a portion of the DC power input to the AC power output. Parallel power conversion sections facilitate modular construction and scalability for installations having different power ratings.

The power converter receives a variable input power, such as a photovoltaic array or a wind turbine, and generates an AC voltage output, preferably compatible with a utility grid. When the input power source is generating enough power to supply a DC voltage to the power converter greater than or equal to the peak magnitude of the desired AC voltage output, each power conversion section operates in parallel to convert the DC voltage to the desired AC voltage output. When the power generated by the variable power source results in a DC voltage having a magnitude less than the peak magnitude of the desired AC voltage output, the power conversion sections are reconfigured to operate in series, wherein a first one of the power conversion sections operates as a boost converter to boost the DC voltage level to a suitable level for the second power conversion section to generate the desired AC output voltage.

In one embodiment of the invention, a power converter for converting a direct current (DC) to an alternating current (AC) includes a first power conversion section having an input and an output, a second power conversion section having an input and an output, and a switching device configured to select between a first and a second mode of operation. During the first mode of operation, the switching device connects the first and the second power conversion sections in parallel to convert at least one DC input to an AC output. During the second mode of operation, the switching device connects the output of the second power conversion section to one of the DC inputs, the input of the second power conversion section in series with the input of the first power conversion section, and the output of the first power conversion section to the AC output. During the first mode of operation, the switching device connects the input of the first and the second power conversion sections in parallel to receive a single DC input and the output of the first and the second power conversion sections in parallel to provide the AC output.

As another aspect of the invention, the power converter includes four switches. The first switch is operably connected between the DC input and the input of the first and second power conversion sections. The second switch is operably connected between the DC input and the output of the second power conversion section. The third switch is operably connected between the output of the first power conversion section and the AC output. The fourth switch is operably connected between the output of the second power conversion section and the AC output. Each of the first, second, third, and fourth switches is selected from one of a relay, a contactor, and a solid-state device.

Thus, it is a feature of the invention to provide a power converter having reconfigurable power conversion sections. The power conversions sections may either be connected in parallel to increase the maximum capacity of the power converter or connected in series to extend the lower operating range of the power converter.

As still another aspect of the invention, the power converter may include a sensor providing a signal representing a magnitude of the voltage present on the DC input. The signal may control the switching device to select the first or second mode of operation. The first mode of operation may be selected if the signal indicates a voltage present on the DC input greater than the peak value of the desired AC output, and the second mode of operation may be selected if the signal indicates a voltage present on the DC input less than the peak value of the desired AC output.

In another embodiment of the present invention, a power converter for converting a variable-frequency alternating current (AC) input to an AC output having a substantially fixed frequency includes a plurality of power conversion sections, and a switching device configured to select between a first and a second mode of operation. Each power conversion section includes a rectifier section configured to convert the variable frequency AC input into a DC voltage, an inverter section configured to convert the DC voltage to the AC output, and a DC link section connected in series between the rectifier section and the inverter section. The first mode of operation connects the plurality of power conversion sections in parallel to convert each of the variable-frequency AC inputs to the AC output. The second mode of operation connects the output of a first of the power conversion sections to the AC output, the output of a second of the power conversion sections to the DC link section of a third of the power conversion sections, and the DC link section of the second of the power conversion sections in series with the DC link section of the first of the power conversion sections.

In yet another embodiment of the present invention, a method of converting direct current (DC) power to alternating current (AC) power using a power converter having at least two power conversion sections is disclosed. The method determines a desired peak value of an AC voltage, and a magnitude of a DC voltage available for conversion. If the magnitude of the DC voltage is greater than the desired peak value of the AC voltage, the power converter is operated in a first mode. During the first mode, the two power conversion sections are connected in parallel and the DC voltage is converted to the AC voltage using both power conversion sections. If the magnitude of the DC voltage is less than the desired peak value of the AC voltage, the power converter is operated in a second mode. During the second mode, the two power conversion sections are connected in series. A first of the two power conversion sections boosts the magnitude of the DC voltage to a new value at least as high as the desired peak value of the AC voltage. A second of the two power conversion sections converts the boosted DC voltage to the AC voltage.

As another aspect of the invention, the magnitude of the DC voltage available for conversion is performed by obtaining a periodic measurement of the DC voltage, and the power converter is configured to selectively operate in one of the first and the second modes according to the measured DC voltage. The DC voltage may be supplied by a photovoltaic array, and the DC voltage level supplied may be determined by operating the power converter such that the photovoltaic array produces substantially the maximum power available. Optionally, the DC voltage is supplied by first rectifying an AC voltage produced by a generator driven by a wind turbine.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWING(S)

Various exemplary embodiments of the subject matter disclosed herein are illustrated in the accompanying drawings in which like reference numerals represent like parts throughout, and in which.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

The various features and advantageous details of the subject matter disclosed herein are explained more fully with reference to the non-limiting embodiments described in detail in the following description.

Figure 1:
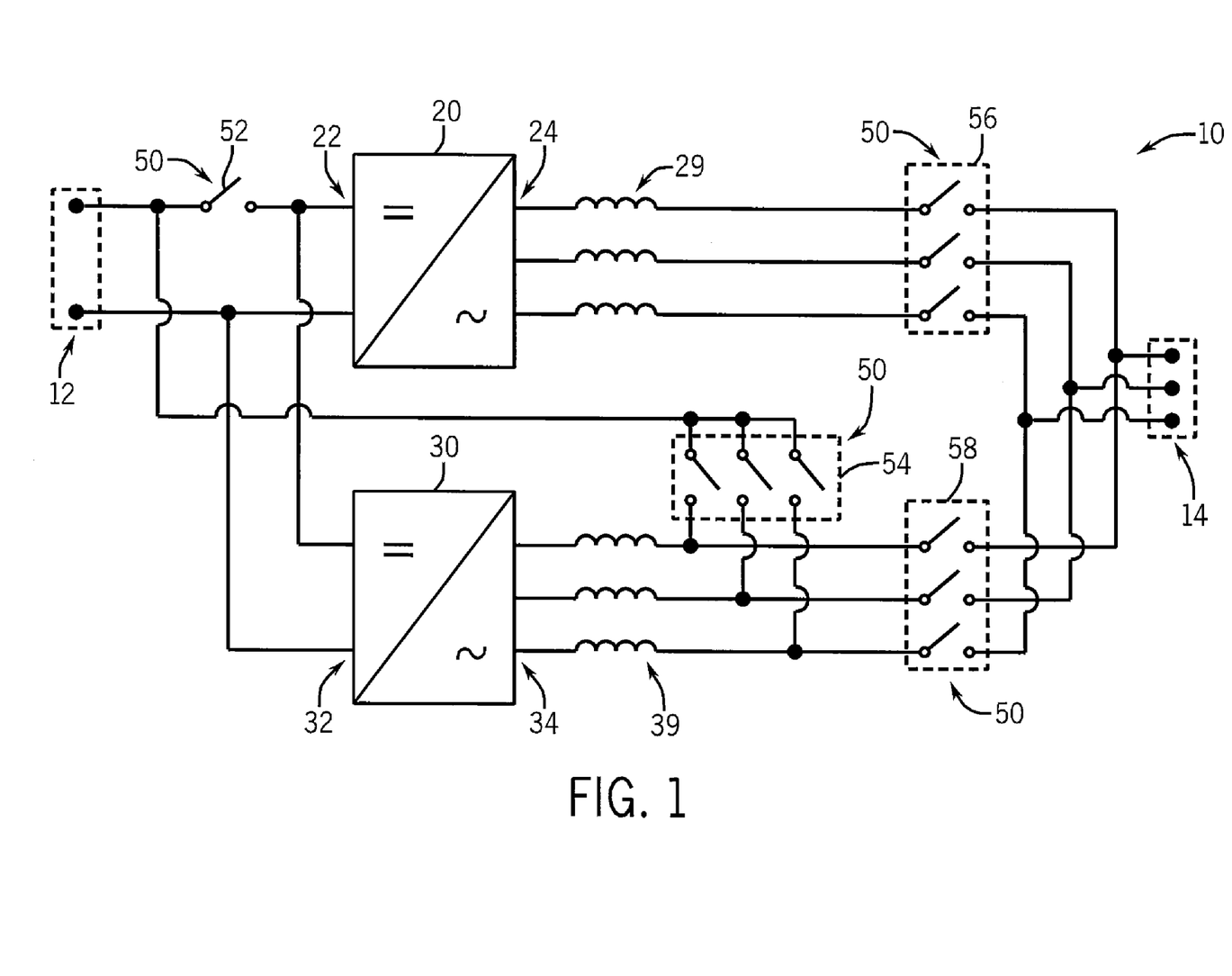
FIG. 1 is a schematic representation of a power converter utilizing a DC boost circuit according to one embodiment of the present invention.

Turning initially to FIG. 1, a power converter 10 having a direct current (DC) input 12 and an alternating current (AC) output 14 is illustrated. The power converter 10 includes a first power conversion section 20 having an input 22 and an output 24 and a second power conversion section 30 having an input 32 and an output 34. A switching device 50 is configured to alternately connect the first and second power conversion sections 20 and 30 either in parallel or in series. It is contemplated that the switching device 50 may be any suitable combination of contactors, relays, mechanical switches, or electrical switches, having a single pole or multiple poles, as required to reconfigure the power converter 10. As used herein, the switching device 50 will be used to collectively refer to each of the individual switches required to reconfigure operation of the power converter 10.

In a first mode of operation, the switching device 50 connects the first and second power conversion sections, 20 and 30, for parallel operation. Each of the power conversion section inputs, 22 and 32, is connected to the power converter input 12 by closing a first switch 52. The power converter input 12 is disconnected from the output 34 of the second power conversion section 30 by opening a second switch 54. The second switch 54 is preferably a three pole switch connecting the positive terminal of the power converter input 12 to each of the three phases of the output 34 of the second power conversion section 30. Optionally, the second switch 54 may be either a single pole switch connecting the power converter input 12 to one of the phases of the output 34 or multiple single pole switches connecting the power converter input 12 to two or more phases of the output 34. Both of the power conversion section outputs, 24 and 34, are connected to the AC output 14 of the power converter 10 by closing a third and a fourth switch, 56 and 58 respectively. Preferably, an inductive filter, 29 or 39, is connected in series between the output, 24 or 34, of the first and second power conversion section, 20 or 30 respectively, to reduce the high frequency electrical components resulting from the switched power conversion.

In a second mode of operation, the switching device 50 connects the first and second power conversion sections, 20 and 30, for series operation. Both of the power conversion section inputs, 22 and 32, are disconnected from the power converter input 12 by opening the first switch 52. The power converter input 12 is connected to the output 34 of the second power conversion section 30 by closing the second switch 54. The second switch 54 is preferably a three pole switch connecting the power converter input 12 to each of the three phases of the output 34 of the second power conversion section 30. Optionally, the second switch 54 may be a single pole switch connecting the power converter input 12 to one of the phases of the output 34 or multiple single pole switches connecting the power converter input 12 to two or more phases of the output 34. The first power conversion section output 24 is connected to the AC output 14 of the power converter 10 by closing the third switch 56. The second power conversion section output 34 is disconnected from the AC output 14 of the power converter 10 by opening the fourth switch 58. Preferably, an inductive filter 29 is connected in series between the output 24 of the first power conversion section 20 and the AC output 14 to reduce the high frequency electrical components resulting from the switched power conversion. The inductive filter 39 of the second power conversion section 30 is connected in series between the power converter input 12 and the output 34 of the second power conversion section 30.

Figure 2:
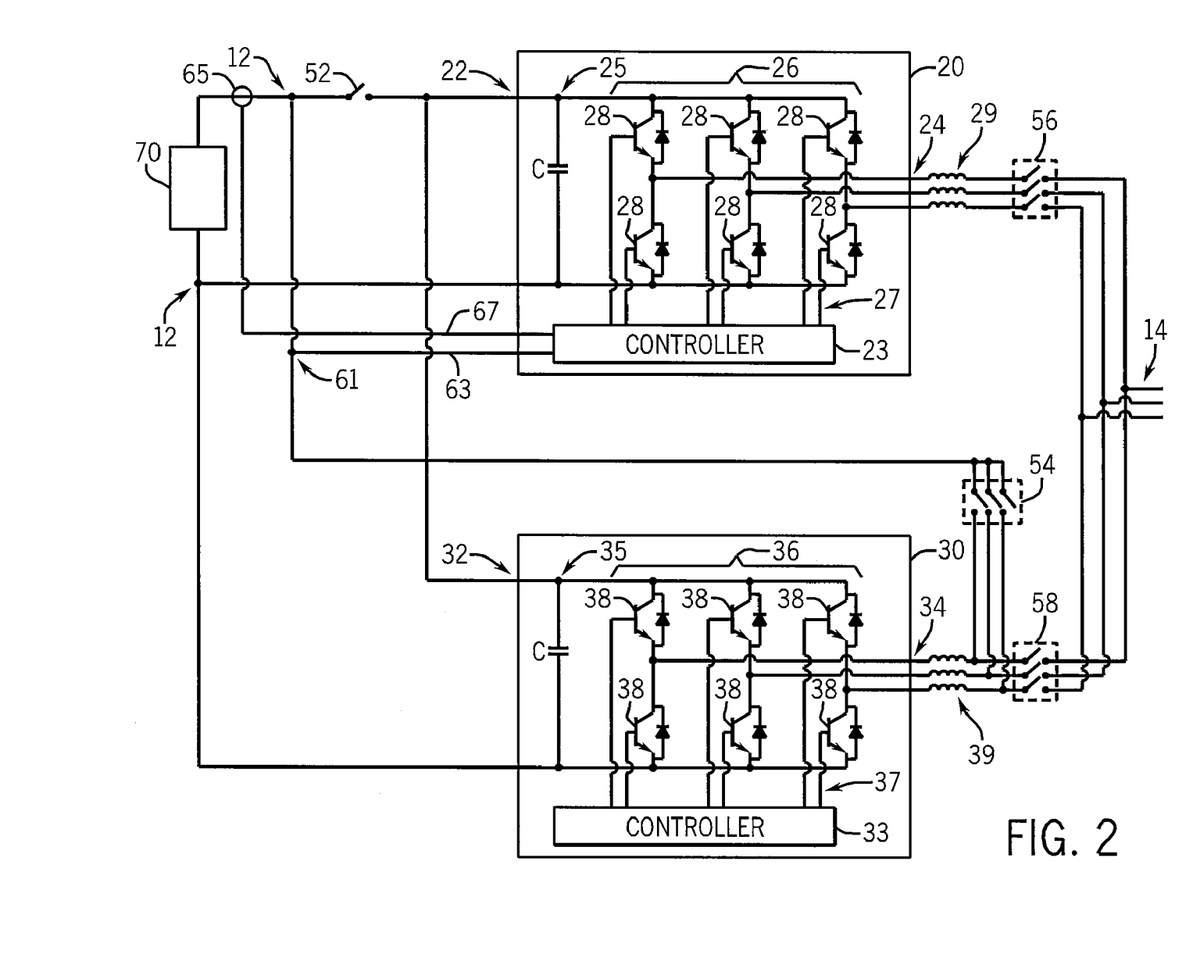
FIG. 2 is a schematic representation of the power converter of FIG. 1 connected to a photovoltaic array.

Referring next to FIG. 2, the power converter 10 of FIG. 1 is utilized to convert DC power generated by a photovoltaic (PV) array 70 to AC power. The PV array 70 is connected to the input 12 of the power converter 10. Preferably, sensors 61 and 65 are connected at the input 12 of the power converter 10 to measure the voltage and current produced by the PV array 70. Signals 63 and 67 representing the measured voltage and current are transmitted to the controller 23 of the first power conversion section 20 and are used for maximum power point tracking and subsequent control of the switching device 50. It is understood that the signals 63 and 67 may be provided to the controller, 23 or 33, of either the first or the second power conversion section, 20 or 30 respectively, or, optionally, to a separate controller managing the PV array 70, without deviating from the scope of the present invention.

Each power conversion section, 20 and 30, further includes a DC link section, 25 and 35, and a switching section, 26 and 36. The switching section 26 or 36 includes multiple controlled switches 28 or 38, which may be but are not limited to transistors, thyristors, or silicon controlled rectifiers, having a fly-back diode connected in parallel across the switch 28 or 38. Three pairs of switches, 28 or 38, and diodes are connected between the positive and negative terminals of the DC link 25 or 35 and one phase of the AC output 24 or 34 is connected between each pair of switches 28 or 38. Each controller 23 and 33 provides gating signals 27 and 37 to selectively connect or disconnect the switches 28 and 38 between the DC link 25 or 35 and the AC output 24 or 34.

Figure 3:
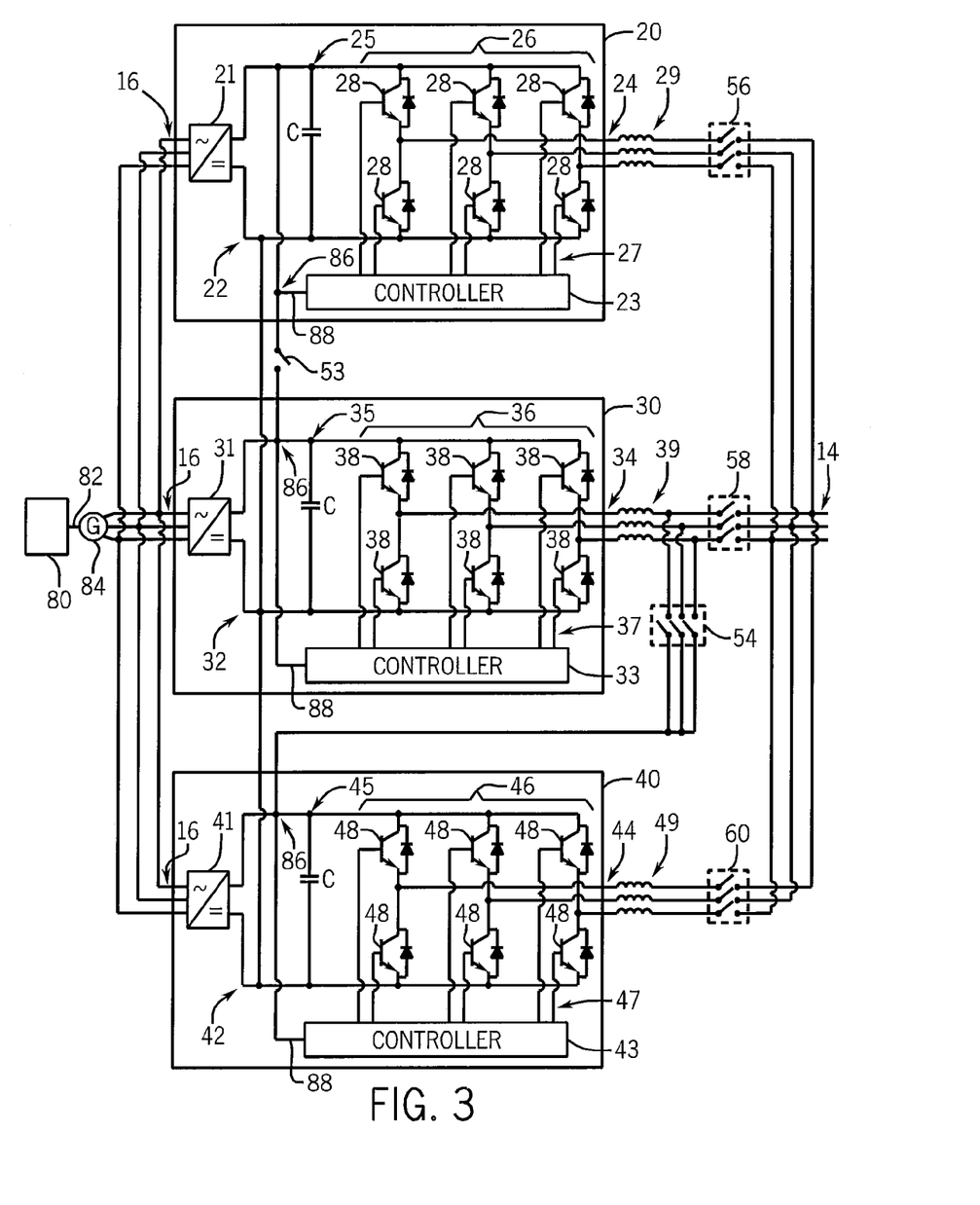
FIG. 3 is a schematic representation of the power converter of FIG. 1 connected to a wind turbine.

Referring next to FIG. 3, the power converter 10 of FIG. 1 is utilized to convert power generated by a wind turbine 80 to AC power. The blades of the wind turbine 80 are connected to a drive shaft 82 which, in turn, drives a generator 84. The generator supplies AC power as an input 16 to each power conversion section, 20, 30, and 40. The frequency of the AC power is dependent on the speed of rotation of the turbine blades. Although a single drive shaft 82 and single generator 84 supplying power to the power conversion sections 20, 30, and 40 is illustrated, it is contemplated that many other configurations of the wind turbine 80 may be utilized without deviating from the scope of the invention. For example, the generator 84 may include multiple windings, each winding independently providing AC power to one of the power conversion sections 20, 30, and 40. Optionally, the wind turbine 80 may include a load-sharing gearbox to split the input drive shaft 82 into multiple output drive shafts, each output drive shaft connected to a separate generator 84.

Each power conversion section 20, 30, and 40 includes a rectifier section, 21, 31, and 41 respectively, converting the AC power to DC power. The DC power is, in turn, provided at the input 22, 32, and 42 to the DC link, 25, 35, and 45 respectively, of each power conversion section, 20, 30, and 40 respectively. Preferably, a sensor 86 is connected across the DC link 25 of at least one of the power conversion sections 20, 30, or 40 to measure the DC voltage produced by the generator 84, and, typically, each power conversion section 20, 30, or 40 includes a sensor 86 measuring the voltage level across the DC link 25. A signal 88 representing the measured voltage is transmitted to the controller 23 to control the switching device 50.

In a first mode of operation, the switching device 50 connects at least the first and second power conversion sections, 20 and 30, for parallel operation. Additional power conversion sections, such as the third power conversion section 40, may similarly be connected for parallel operation as available. During parallel operation, the second switch 54 is opened to disconnect the DC link 45 of the third power conversion section 40 from the output 34 of the second power conversion section 30, and each of the power conversion sections 20, 30, and 40 are connected by the third, fourth, and fifth switches, 56, 58, and 60 respectively, to the output 14 of the power converter. The DC links 25, 35, and 45 may be connected in one of several configurations as discussed in more detail below.

As illustrated in FIG. 3, parallel operation is one typical configuration of the power conversion sections 20, 30, and 40. Each power conversion section 20, 30, or 40, has a separate DC link, 25, 35, or 45 respectively. The negative rails are preferably connected together to establish a return conduction path during series operation of the power conversion sections 20 and 30. Optionally, the connection between the negative rails may be made through another switch (not shown) to selectively connect the negative rails during series operation. If the power converter 10 utilizes separate DC links 25, 35, and 45, the first switch 53 may be connected between one of the two rails of the DC link 25 and 35 of the first and second power conversion sections, 20 and 30 respectively. The switch 53 is opened to separate the DC links 25 and 35 during parallel operation and closed to connect the DC links 25 and 35 during series operation.

As another option, the DC links 25, 35, and 45 may be connected in parallel for operation as a common DC link (not shown) by connecting both the positive and negative rails of each power conversion section 20, 30, and 40 respectively. If the power converter 10 utilizes a common DC link, the first switch 53 is connected between one of the two rails of the DC link 35 and 45 of the second and third power conversion sections, 30 and 40 respectively. The switch 53 is closed to connect the DC links 35 and 45 during parallel operation and opened to separate the DC links 35 and 45 during series operation of the power conversion sections 20, 30, and 40.

As still another option, the first two DC links 25 and 35 may be connected in parallel with both the positive and negative rails connected and any additional DC links, such as the DC link 45 of the third power conversion section 40, connected at only the negative rail. In this configuration, the DC links 25 and 35 operate as parallel DC links during parallel operation of the power converter 10 and operate in series during series operation of the power converter 10 without requiring any additional switching between the two DC links 25 and 35.

In a second mode of operation, the switching device 50 connects the first and second power conversion sections, 20 and 30, for series operation. Both of the power conversion section inputs, 22 and 32, will be disconnected from the power converter input by reverse-biasing the rectifier section 21 and 31 as discussed in more detail below. The output 34 of the second power conversion section 30 receives a DC voltage from the DC link 45 of the third power conversion section 40 by closing the second switch 54. The second switch 54 is preferably a three pole switch connecting the DC link 45 of the third power conversion section 40 to each of the three phases of the output 34 of the second power conversion section 30. Optionally, the second switch 54 may be a single pole switch connecting the DC link 45 of the third power conversion section 40 to one of the phases of the output 34 or multiple single pole switches connecting the DC link 45 of the third power conversion section 40 to two or more phases of the output 34. The first power conversion section output 24 is connected to the AC output 14 of the power converter 10 by closing the third switch 56. The second and third power conversion section outputs 34 and 44 are disconnected from the AC output 14 of the power converter 10 by opening the fourth and fifth switches, 58 and 60 respectively.

Figure 5:
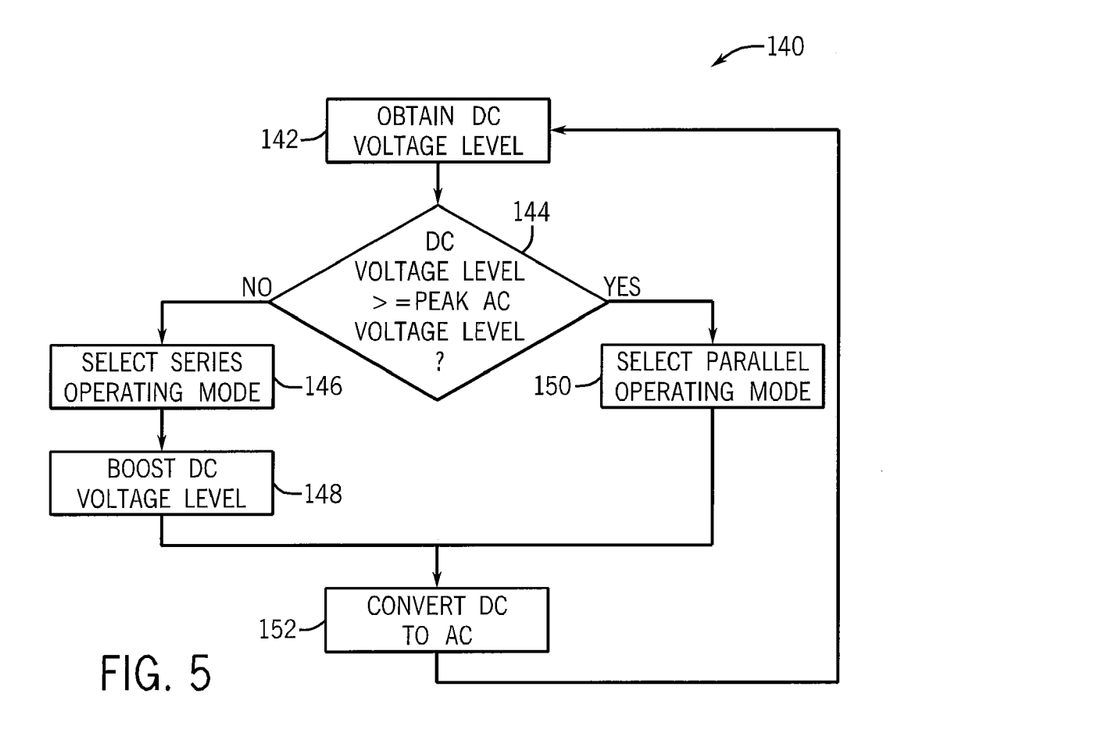
FIG. 5 is a flowchart illustrating the method of configuring the power conversion sections for operation either in series or in parallel.

In operation, the power converter 10 selectively operates in one of two operating modes via the controllers 23, 33, and 43, according to the flow chart 140 of FIG. 5. At step 142, the level of the DC voltage being generated is obtained. The switching device 50 alternately connects the first and the second power conversion sections 20 and 30 either in a parallel configuration or a serial configuration by comparing the level of the DC voltage to the peak value of the desired AC output voltage in step 144. If the level of the DC voltage is less than the peak value of the desired AC output voltage, the switching device 50 selects a series operating mode, according to step 146. At step 148, one of the power conversion sections 20 or 30 is used to boost the DC voltage level to a suitable level for performing the DC to AC conversion, and the other of the power conversion sections 20 or 30 performs the DC to AC power conversion, according to step 152. If the level of the DC voltage is greater than or equal to the peak value of the desired AC output voltage, the switching device 50 selects a parallel operating mode, according to step 150. In the parallel operating mode, both of the power conversion sections 20 and 30 convert a portion of the DC power available at the input 12 of the power converter 10 to AC power available at the output 14 of the power converter 10, according to step 152. Steps 142 to 152 are then periodically repeated to monitor the level of the DC voltage being generated and configure operation of the power converter 10 accordingly.

Figure 6:
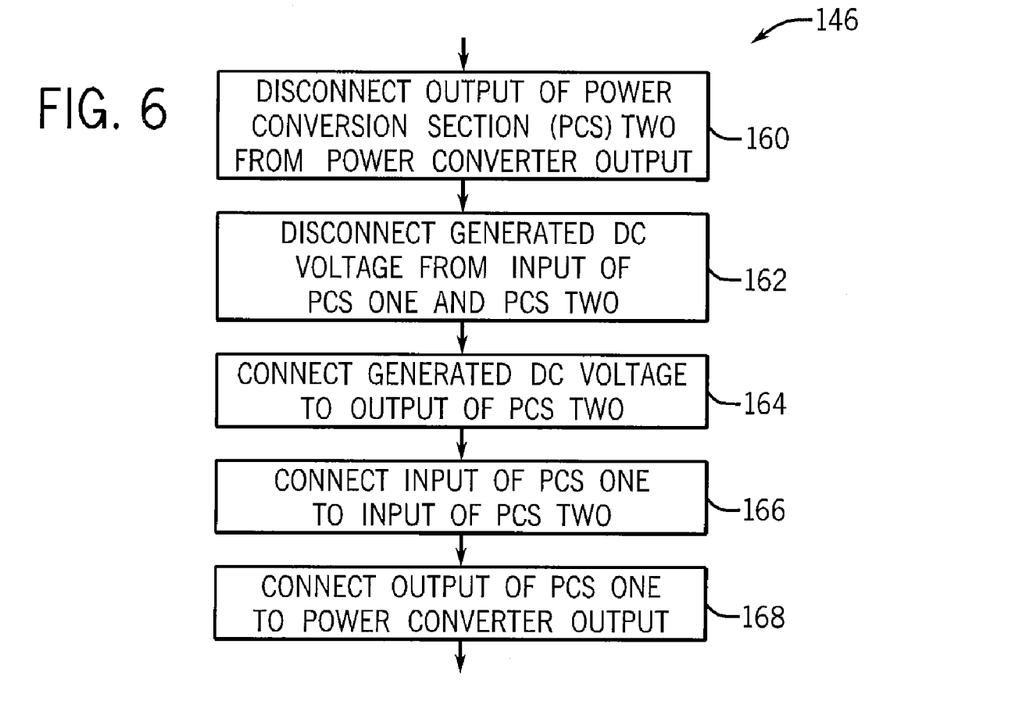
FIG. 6 is a flowchart illustrating the steps for selecting series operation of the power conversion sections from FIG. 5.

Referring to FIG. 6, selection of the series operating mode at step 146 is described in more detail. In step 160, the output 34 of the second power conversion section 30 is disconnected from the power converter output 14. At step 162, the DC voltage generated by the energy source is disconnected from the inputs 22 and 32 of the first and second power conversion sections, 20 and 30, respectively. The DC voltage generated by the energy source is connected to the output 34 of the second power conversion section 30 according to step 164. At step 166, the inputs 22 and 32 of the first and second power conversion sections 20 and 30, respectively, are connected. Optionally, the inputs 22 and 32 may be continuously connected either because the power conversion sections 20 and 30 utilize a common DC bus or because the inputs 22 and 32 are connected in either operating mode. The output 24 of the first power conversion section 20 is, at step 168, connected to the output 14 of the power converter 10.

Figure 7:
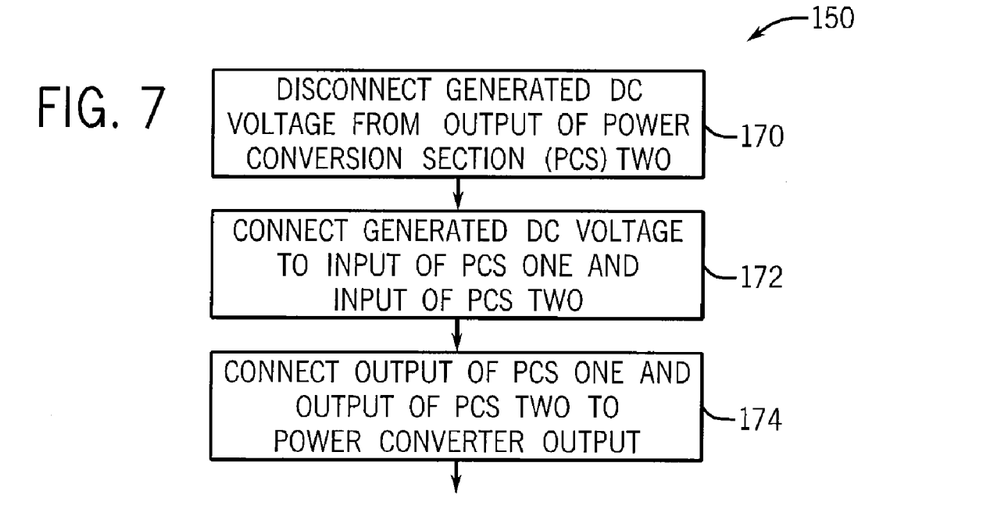
FIG. 7 is a flowchart illustrating the steps for selecting parallel operation of the power conversion sections from FIG. 5.

Referring to FIG. 7, selection of the parallel operating mode at step 150 is described in more detail. The DC voltage generated by the energy source is disconnected from the output 34 of the second power conversion section 30 according to step 170. The DC voltage generated by the energy source is connected to the inputs 22 and 32 of the first and second power conversion sections 20 and 30, respectively, according to step 172. The outputs 24 and 34 of the first and second power conversion sections 20 and 30, respectively, are, at step 174, connected to the output 14 of the power converter 10.

Figure 4:
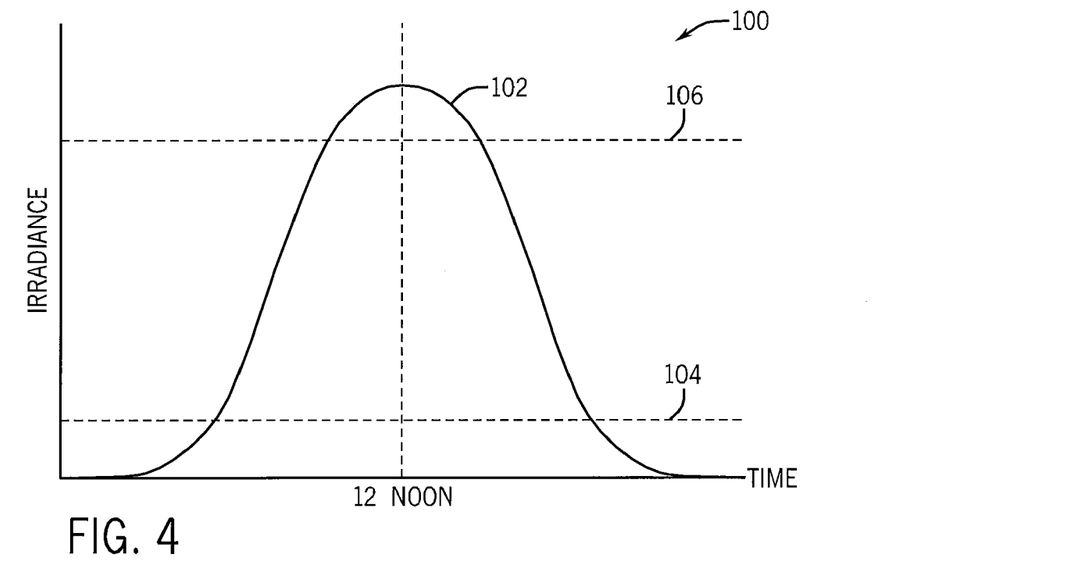
FIG. 4 is a graphical representation of the typical power generated by a photovoltaic array during the course of a day.

Operation of the power converter 10 in cooperation with a PV array 70 is next discussed with respect to FIGS. 2 and 4. The power generated by the PV array 70 typically follows a bell-shaped curve 100 as shown in FIG. 4. During the course of the day, the angle and amount of light incident on the array varies resulting in production of power that generally follows the curve 100. Historically, power converters have had to wait for the PV array to generate a minimum threshold 104 of power before beginning power conversion. This minimum threshold 104 corresponds to a point at which the PV array can maintain a DC voltage level greater than or equal to the peak value of the desired AC voltage output from the converter 10. Consequently, steps have been taken to reduce the peak value of the AC output, such as providing an output transformer between the power converter output and the utility grid such that the power converter may begin operating at a lower minimum threshold 104. However, by reducing the lower threshold 104, the current rating of the power converter 10 may establish a maximum threshold 106, at which the converter can operate, less than the peak power capabilities of the PV array. Consequently, there have been tradeoffs between designing for a lower minimum threshold 104 and having sufficient capacity in the converter to convert the peak power produced by the PV array. The dual operating modes of the present converter 10 allow operation from zero, or near zero, to peak power production by the PV array 70.

During the first mode of operation, the switching device 50 connects the first and second power conversion sections, 20 and 30, for parallel operation. A capacitor, C, connected across each DC link 25 or 35 helps maintain the level and reduce the ripple of the DC voltage present on the DC link 25 or 35. The controller 23 or 33 generates gating signals 27 or 37, which are a function of the power generated by the PV array 70 and the level of the DC voltage present on the DC link 25 or 35, to selectively open or close each of the switches 28 or 38 between the DC link 25 and one phase of the AC output 24 or 34. The AC voltage output from each power conversion section 20 and 30 must be synchronized in phase with each other and, if connecting to a utility grid, with the utility grid as well. The output 24 and 34 of each power conversion section 20 and 30, respectively, are connected together and supplied as the output 14 of the power converter 10. Thus, each power conversion section 20 or 30 converts a portion of the DC power generated by the PV array 70 to AC output power.

In a second mode of operation, the switching device 50 connects the first and second power conversion sections, 20 and 30, for series operation. During series operation, the second power conversion section 30 is operating as a boost converter, and the inductive filter 39 operates in cooperation with the controlled switches 38 to boost the level of the DC voltage generated by the PV array 70 to a desired level on the DC link 35. The controller 33 of the second power conversion section 30 generates gating signals 37, which are a function of the power generated by the PV array 70 and the DC voltage level required on the DC link 25. The controller 33 may generate any suitable sequence of gating signals 37 as is known in the art to boost the DC voltage from the output 34 to the input 32 of the second power conversion section 30. If all three output phases are connected by the second switch 54 to the DC voltage generated by the PV array, the controller 33 generates gating signals 37 for each output phase to conduct for a portion of the time, sharing the load of boosting the DC voltage. Optionally, if only a single phase is connected by the second switch 54 to the DC voltage generated by the PV array, the controller 33 generates gating signals 37 for the appropriate phase to perform the entire boosting function. The boosted DC voltage is present on the DC link 35 of the second power conversion section 30 which is, in turn, connected to the DC link 25 of the first power conversion section 20.

The first power conversion section 20 is then used to convert the boosted DC voltage to the desired AC output voltage. The controller 23 of the first power conversion section 30 generates gating signals 27, which are a function of the level of the DC voltage present on the DC link 25, to selectively open or close each of the switches 28 between the DC link 25 and one phase of the AC output 24. Because the total power being generated by the PV array 70 is low during this operating mode, typically less than 10% of the rated capacity, and each power conversion section 20 or 30 is typically sized to convert at least 50% of the power generated by the PV array 70 during parallel operation, each of the power conversion sections 20 and 30 is capable of handling the total power converted during series operation.

Operation of the power converter 10 in cooperation with a wind turbine 80 is next discussed with respect to FIG. 3. The power generated by the wind turbine is dependent on the velocity of the wind and the subsequent angular velocity of the turbine blades. The turbine blades rotate an input shaft 82 which may be directly connected to a generator 84. The generator 84 provides a variable frequency AC power, the frequency of which is dependent on the angular velocity of the turbine blades. Consequently, a power converter 10 connected to the turbine 80 first rectifies the variable frequency AC voltage to a DC voltage on the DC link 25, 35, or 45 and then converts the DC voltage to a constant frequency AC output voltage suitable for connection to a utility grid. Because the DC link 25, 35, or 45 requires a minimum voltage level to produce the desired AC output voltage, wind turbines 80 have historically needed to rotate at a minimum speed, the cut-out speed, for proper operation of the power converter 10. The present invention expands the range of operation of the power converter 10 to begin at near zero, or zero speed of the turbine 80.

During the first mode of operation, the switching device 50 connects each of power conversion sections 20, 30, and 40 for parallel operation. A capacitor, C, connected across each DC link 25, 35, and 45 helps maintain the level and reduce the ripple of the DC voltage present on the DC link 25, 35, or 45. Each controller 23, 33, and 43 generates gating signals 27, 37, and 47, respectively, which are a function of the power generated by the wind turbine 80 and the level of the DC voltage present on each DC link 25, 35, or 45 to selectively open or close each of the switches 28, 38, or 48 between each DC link 25, 35, or 45 and one phase of the AC output 24, 34, or 44. The AC voltage output from each power conversion section 20, 30, and 40 must be synchronized in phase with each other and, if connecting to a utility grid, with the utility grid as well. The outputs 24, 34, and 44 of each power conversion section 20, 30, and 40 are connected together and supplied as the output 14 of the power converter 10.

In a second mode of operation, the switching device 50 connects the first and second power conversion sections 20 and 30 for series operation. During series operation, the second power conversion section 30 is operating as a boost converter, and the inductive filter 39 operates in cooperation with the controlled switches 38 to boost the level of the DC voltage at the output 34 to a desired level on the DC link 35.

The DC voltage present at the output 34 of the second power conversion device 30 is provided by the DC link 45 of the third power conversion device 40. The controller 33 of the second power conversion section 30 generates gating signals 37, which are a function of the DC voltage level on the DC link 45 of the third power conversion device 40 and the DC voltage level required on the DC link 35 of the second power conversion device 30. The controller 33 may generate any suitable sequence of gating signals 37 as is known in the art to boost the DC voltage from the output 34 to the input 32 of the second power conversion section 30. If all three output phases are connected to the DC link 45, the controller 33 generates gating signals 37 for each phase to conduct for a portion of the time, sharing the load of boosting the DC voltage. Optionally, if only a single phase is connected to the DC link 45, the controller 33 generates gating signals 37 for the appropriate phase to perform the entire boosting function. The boosted DC voltage is present on the DC link 35 of the second power conversion section 30 which is, in turn, connected to the DC link 25 of the first power conversion section 20.

The boosted DC voltage on the DC link 25 and 35 operates to prevent the generator 84 connected to each of the first and second power conversion sections 20 and 30 from supplying power to the DC link 25 and 35. The level of the boosted DC voltage on the DC link 25 and 35 is preferably selected to be greater than the value of the DC voltage resulting from each of the rectifier sections 21 and 31. Consequently, the semiconductor devices, such as diodes or thyristors, will be reversed-biased, disabling the rectifier section 21 and 31. If the rectifier section is made up of a controlled switch, such as a transistor, the controlled switch may optionally be switched off to prevent conduction during boost operation. The first power conversion section 20 is then used to convert the boosted DC voltage to the desired AC output voltage. The controller 23 of the first power conversion section 20 generates gating signals 27, which are a function of the level of the DC voltage present on the DC link 25, to selectively open or close each of the switches 28 between the DC link 25 and one phase of the AC output 24.

Operation of the power converter 10 is discussed herein with respect to two exemplary environments, namely in cooperation with a PV array and a wind turbine. Further, each example describes the power conversion sections 20 in terms of a two-level voltage source inverter. These embodiments are not meant to be limiting. The converter 10 disclosed herein may be used in other environments or with other types of power conversion sections, such as a multi-level converter, without deviating from the scope of the present invention.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

I claim:

1. A power converter for converting a direct current (DC) to an alternating current (AC), comprising:
    a first power conversion section having an input and an output;
    a second power conversion section having an input and an output; and
    a switching device configured to select between a first and a second mode of operation, wherein, during the first mode of operation, the switching device connects the first and the second power conversion sections in parallel to convert at least one DC input to an AC output and wherein, during the second mode of operation, the switching device connects the output of the second power conversion section to one of the DC inputs, the input of the second power conversion section in series with the input of the first power conversion section, and the output of the first power conversion section to the AC output.

2. The power converter of claim 1 wherein the second power conversion section further comprises a switching section having a plurality of controlled switches operably connected between the input and the output.

3. The power converter of claim 2 wherein the controlled switches convert a DC voltage to an AC voltage during the first mode of operation and the controlled switches convert a DC voltage having a first magnitude to a DC voltage having a second magnitude greater than the first magnitude during the second mode of operation.

4. The power converter of claim 1 wherein the AC output includes three phases, each phase synchronized with one phase of a utility grid for connection with the utility grid.

5. The power converter of claim 1 wherein, during the first mode of operation, the switching device connects the input of the first and the second power conversion sections in parallel to receive a single DC input and the output of the first and the second power conversion sections in parallel to provide the AC output.

6. The power converter of claim 5 wherein the switching device further comprises:
    a first switch operably connected between the DC input and the input of the first and second power conversion sections;
    a second switch operably connected between the DC input and the output of the second power conversion section;
    a third switch operably connected between the output of the first power conversion section and the AC output; and
    a fourth switch operably connected between the output of the second power conversion section and the AC output.

7. The power converter of claim 6 wherein each of the first, second, third, and fourth switches is selected from one of a relay, a contactor, and a solid-state device.

8. The power converter of claim 5 further comprising a sensor providing a signal representing a magnitude of the voltage present on the DC input wherein the signal controls the switching device to select the first or second mode of operation.

9. The power converter of claim 8 wherein the switching device is configured to select the first mode of operation if the signal indicates a voltage present on the DC input greater than the peak value of the desired AC output and the switching device is configured to select the second mode of operation if the signal indicates a voltage present on the DC input less than the peak value of the desired AC output.

10. The power converter of claim 1 further comprising a third power conversion section having an input and an output, wherein the first mode of operation connects the input of each of the first, second, and third power conversion sections to a respective first, second, and third DC input, and connects the output of the first, second, and third power conversion sections in parallel to provide the AC output and wherein the second mode of operation connects the output of the second power conversion section to the third DC input.

11. A power converter for converting a variable-frequency alternating current (AC) input to an AC output having a substantially fixed frequency, comprising:
- a plurality of power conversion sections, each power conversion section further comprising:
  - a rectifier section configured to convert the variable frequency AC input into a DC voltage,
  - an inverter section configured to convert the DC voltage to the AC output, and
  - a DC link section connected in series between the rectifier section and the inverter section;
- a switching device configured to select between a first and a second mode of operation, wherein the first mode of operation connects the plurality of power conversion sections in parallel to convert each of the variable-frequency AC inputs to the AC output and wherein the second mode of operation connects the output of a first of the power conversion sections to the AC output, the output of a second of the power conversion sections to the DC link section of a third of the power conversion sections, and the DC link section of the second of the power conversion sections in series with the DC link section of the first of the power conversion sections.

12. The power converter of claim 11 wherein the switching device further comprises:
- a first switch operably connected between the DC link section of the first power conversion section and the DC link of the second power conversion section;
- a second switch operably connected between the DC link section of the third power conversion section and the output of the second power conversion section;
- a third switch operably connected between the output of the first power conversion section and the AC output;
- a fourth switch operably connected between the output of the second power conversion section and the AC output;
- a fifth switch operably connected between the output of the third power conversion section and the AC output.

13. The power converter of claim 12 wherein each of the first, second, third, fourth, and fifth switches is selected from one of a relay, a contactor, and a solid-state device.

14. The power converter of claim 11 further comprising a sensor providing a signal representing a magnitude of the DC voltage in one of the power conversion sections wherein the signal controls the switching device to select the first or second mode of operation.

15. The power converter of claim 14 wherein the switching device is configured to select the first mode of operation if the signal indicates a DC voltage greater than the peak value of the desired AC output and the switching device is configured to select the second mode of operation if the signal indicates a DC voltage less than the peak value of the desired AC output.

16. A method of converting direct current (DC) power to alternating current (AC) power using a power converter having at least two power conversion sections, comprising the steps of:
- determining a desired peak value of an AC voltage;
- determining a magnitude of a DC voltage available for conversion;
- if the magnitude of the DC voltage is greater than the desired peak value of the AC voltage, operating the power converter in a first mode, further comprising the steps of:
  - connecting the two power conversion sections in parallel, and
  - converting the DC voltage to the AC voltage using both power conversion sections; and
- if the magnitude of the DC voltage is less than the desired peak value of the AC voltage, operating the power converter in a second mode, further comprising the steps of:
  - connecting the two power conversion sections in series,
  - boosting the magnitude of the DC voltage to a new value at least as high as the desired peak value of the AC voltage using a first of the two power conversion sections, and
  - converting the boosted DC voltage to the AC voltage using a second of the two power conversion sections.

17. The method of claim 16 wherein determining the magnitude of the DC voltage available for conversion is performed by obtaining a periodic measurement of the DC voltage and the power converter is configured to selectively operate in one of the first and the second modes according to the measured DC voltage.

18. The method of claim 17 wherein the DC voltage is supplied by a photovoltaic array.

19. The method of claim 18 wherein the DC voltage wherein the DC voltage level supplied by the photovoltaic array is determined by operating the power converter such that the photovoltaic array produces substantially the maximum power available.

20. The method of claim 17 wherein the DC voltage is supplied by first rectifying an AC voltage produced by a generator driven by a wind turbine.

* * * * *